United States Patent
Liu et al.

(10) Patent No.: US 8,619,753 B1
(45) Date of Patent: Dec. 31, 2013

(54) SERVICE PERIOD RECOVERY SCHEME FOR WIRELESS COMMUNICATIONS

(75) Inventors: Yong Liu, Santa Clara, CA (US); Raja Banerjea, Sunnyvale, CA (US)

(73) Assignee: Marvell International Ltd., Hamilton (BM)

( * ) Notice: Subject to any disclaimer, the term of this patent is extended or adjusted under 35 U.S.C. 154(b) by 448 days.

(21) Appl. No.: 12/558,239

(22) Filed: Sep. 11, 2009

Related U.S. Application Data (60) Provisional application No. 61/101,950, filed on Oct. 1, 2008, provisional application No. 61/097,019, filed on Sep. 15, 2008.

(51) Int. Cl.
*H04B 7/212* (2006.01)
*H04W 4/00* (2009.01)

(52) U.S. Cl.
USPC ........... 370/348; 370/322; 370/327; 370/329; 370/340; 370/341

(58) Field of Classification Search
None
See application file for complete search history.

(56) References Cited

U.S. PATENT DOCUMENTS

| | | | |
|---|---|---|---|
| 2007/0171858 A1* | 7/2007 | Grandhi et al. | 370/328 |
| 2009/0232116 A1* | 9/2009 | Li et al. | 370/338 |
| 2010/0040008 A1* | 2/2010 | Diachina et al. | 370/329 |
| 2011/0194538 A1* | 8/2011 | Zheng et al. | 370/335 |

* cited by examiner

*Primary Examiner* — Ayaz Sheikh
*Assistant Examiner* — Sori Aga (57) ABSTRACT

Systems and methods for service period recovery in a wireless communications system are provided. An initial service period for transmitting data is assigned to a first remote station. Data period schedule information, including the assignment of the initial service period, is transmitted from a central station. In response to determining that the first remote station is not transmitting during the initial service period, a modified service period is assigned to the first remote station. A service period change announcement, including the assignment of the modified service period, is transmitted from the central station. In response to determining that the first remote station is not transmitting during the modified service period, the initial service period is truncated and a service period truncation is transmitted from the central station.

17 Claims, 7 Drawing Sheets

FIG. 6 ns system 100 of
SERVICE PERIOD RECOVERY SCHEME FOR WIRELESS COMMUNICATIONS

CROSS REFERENCE TO RELATED APPLICATION

This claims the benefit of commonly-assigned U.S. Provisional Patent Application No. 61/097,019, filed Sep. 15, 2008, now expired, and U.S. Provisional Patent Application No. 61/101,950, filed Oct. 1, 2008, now expired, both of which are hereby incorporated by reference herein in their entirety.

BACKGROUND

This relates to a method and apparatus pertaining to service period recovery for wireless communications.

In wireless communications systems, communications channels may be shared between multiple transmitting and receiving stations using time multiplexing schemes. A central station may control use of the communications channels and may allocate time periods amongst various remote stations. If a remote station is unaware of the allocations made by the central station, the time periods may be wasted.

SUMMARY

The present disclosure relates to a method for service period recovery in a wireless communications system. An initial service period for transmitting data is assigned to a first remote station. Data period schedule information, including the assignment of the initial service period, is transmitted from a central station. In response to determining that the first remote station is not transmitting during the initial service period, a modified service period is assigned to the first remote station. A service period change announcement, including the assignment of the modified service period, is transmitted from the central station. In response to determining that the first remote station is not transmitting during the modified service period, the initial service period is truncated and a service period truncation is transmitted from the central station.

In another embodiment, in response to determining that the first remote station is not transmitting during the initial service period, the initial service period is truncated. A polling request is transmitted to a second remote stations. A request for data transmission time is received from the second remote station and a service period grant announcement is transmitted to the second remote station. In some embodiments, the service period grant announcement is also sent to the first remote station to remind the first station about the scheduling of upcoming service periods (in case the first remote station missed previously transmitted service period schedule information).

The present disclosure relates to a wireless communications system that includes a central station. The central station assigns an initial service period for transmitting data to a first remote station and transmits schedule information including the assignment of the initial service period. In response to a determination that the first remote station is not transmitting during the initial service period, the central station assigns a modified service period to the first remote station and transmits a service period change announcement including the assignment of the modified service period. In response to a determination that the first remote station is not transmitting during the modified service period, the central station truncates the initial service period and transmits a service period truncation.

BRIEF DESCRIPTION OF THE DRAWINGS

Further features of the disclosure, its nature and various advantages, will be apparent upon consideration of the following detailed description, taken in conjunction with the accompanying drawings, in which like reference characters refer to like parts throughout, and in which.

DETAILED DESCRIPTION

Figure 1:
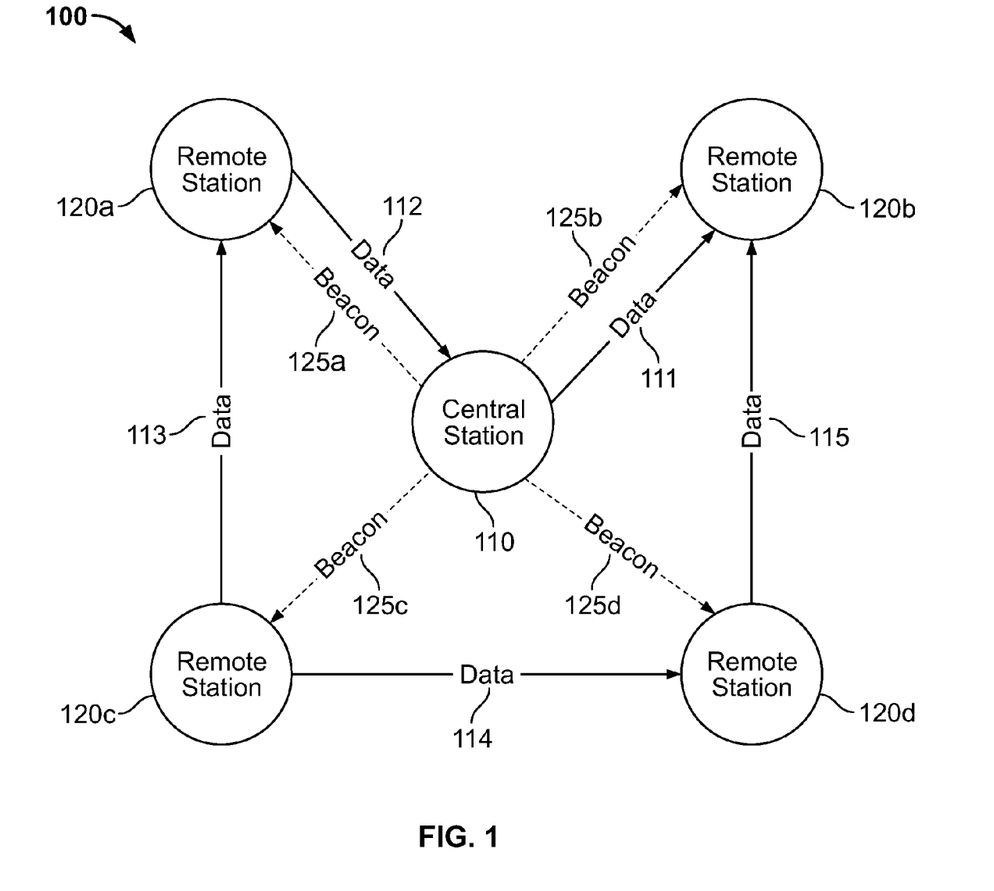
FIG. 1 is an illustration of a wireless communications system implementing a service period recovery scheme in accordance with some embodiments.

FIG. 1 is an illustration of a wireless communications system 100 implementing a service period recovery scheme in accordance with some embodiments. For illustrative purposes and not by way of limitation, the wireless communications system of FIG. 1 may use a 60 GHz carrier frequency to provide directional transmissions having data rates that may exceed 1 gigabit per second. It should be understood, however, that the embodiments of this disclosure are applicable to any suitable wireless communications system.

Wireless communications system 100 includes a central station 110 that is configured to communicate with a plurality of remote stations 120 (i.e., remote stations 120a, 120b, 120c, and 120d). A plurality of central stations (not shown) may be interconnected to form a mobile or cellular network. Each central station can be configured to communicate with remote stations located in a particular physical area within that central station's radio communications range.

The plurality of remote stations 120 are also configured to communicate directly with any of the other remote stations 120 within a physical area. The physical area may be referred to as a radio cell. Wireless communications system 100 of FIG. 1 represents a single radio cell including one central station 110 and a plurality of remote stations 120. For example, as illustrated in FIG. 1, central station 110 transmits data signal 111 to remote station 120b, remote station 120a transmits data signal 112 to central station 110, and remote stations 120a, 120b, 120c, and 120d communicate with each other over data signals 113, 114, and 115, respectively.

Remote stations 120 of wireless communications system 100 may be any suitable type of cellular telephone. The remote stations may also be a computer, laptop, portable computing device, personal digital assistant, server, radar system, satellite, scanner, television, set-top box, DVD player, or any other stationary or portable device that has high-frequency wireless communications capabilities. Central station 110 can be a dedicated base station or can be another remote station that is designated as the central station to coordinate communication with and between remote stations 120.

Remote stations 120 each have a plurality of antennas (not shown) for transmitting and receiving signals from central station 110 and from other remote stations 120. The plurality of antennas may be directive antennas such that the antennas of a transmitting station may be configured to "point" in the direction of a particular receiving station. The antennas of a receiving station may also be configured to point to the direction of a transmitting station. The antennas may be pointed by physically changing the orientation of the antennas or by using beam forming or other suitable signal processing techniques. Central station 110 also has a plurality of antennas that may be directive. Central station 110 transmits beacon signals 125a, 125b, 125c, and 125d to each of the respective remote stations 120 by pointing the antennas of central station 110, in turn, at each of the remote stations 120. Note that beacon signals 125 may be transmitted in all possible directions from central station 110 in order to attract or guide fresh new and existing remote stations 120. It should be understood that central station 110 need not transmit beacon signals 125 to particular remote stations 120. When beacon signals 125 are transmitted in all directions, they should be received by all remote stations 120 in range. Alternatively, central station 110 may broadcast a single beacon signal (not shown) to all of the remote stations 120.

Remote stations 120 may operate using any suitable protocol that is compatible with central station 110 and with the mobile network in general. For example, central station 110 and remote stations 120 can operate using any suitable conventional wireless communications protocol, such as the IEEE 802.11-wireless LAN standard or using a non-conventional protocol.

Central station 110 and mobile stations 120 may use any of a variety of modulation and coding schemes to enable reliable communication. For example, the stations may operate with a modulation scheme based on orthogonal frequency division multiplexing ("OFDM"). The stations include conventional circuitry for wireless communication including, but not limited to, antennas, transmitters, receivers, encoders, decoders, modulators, demodulators, processors, and memory. For example, central station 110 and remote stations 120 may include hardware components and protocol layers that are similar to the IEEE 802.11n and other 802.11 standards.

Wireless communications system 100 can use a time division multiple access ("TDMA") based protocol to share wireless communications channels between central station 110 and the plurality of remote stations 120. These shared wireless communications channels are used for communication between central station 110 and remote stations 120 and for communication between the remote stations 120. The wireless communications channel may be divided into a plurality beacon intervals. Each beacon interval includes one or more time periods that may used by central station 110 and remote stations 120 to transmit and receive data and control information.

Figure 2:
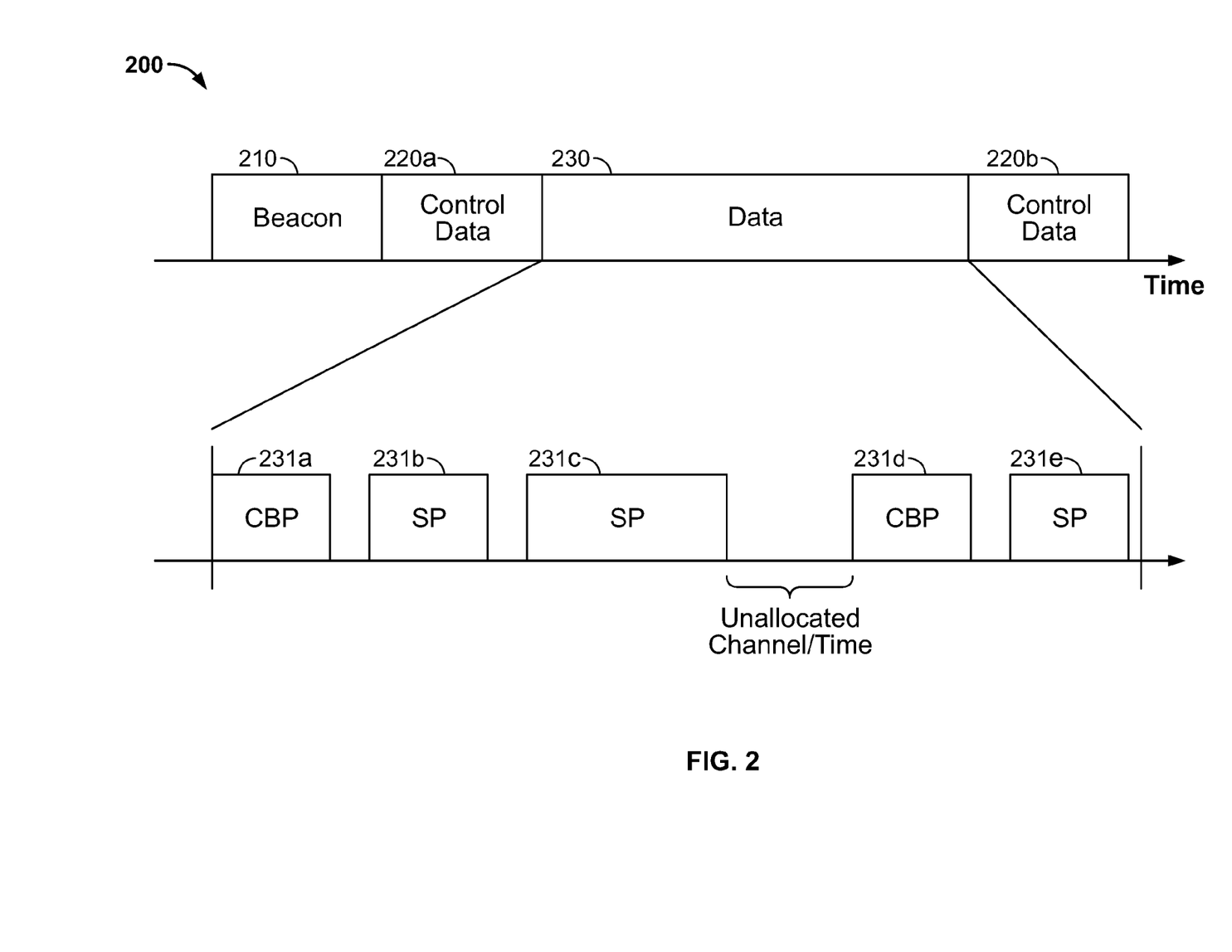
FIG. 2 is an illustration of a beacon interval including multiple service periods and contention based periods in accordance with some embodiments.

FIG. 2 illustrates a simplified beacon interval 200. Beacon interval includes a beacon transmission time 210, control data transmission time 220a and 220b (which may sometimes be referred to collectively as control data transmission time 220), and data transmission time 230. Data transmission time 230 includes a plurality of data periods including contention based periods ("CBP") 231a and 231d and service periods ("SP") 231b, 231c, and 231e. These data periods may be collectively referred to herein as data periods 231. Contention based periods are data periods that may be used by any of the stations (central station 110 or remote stations 120 (FIG. 1)) to communicate with any other station by dynamically contending for the channel resource. During these periods, any station may begin to communicate with any other station as long as the data period is not being used. If multiple stations attempt to use a contention based period at the same time, a collision occurs. If a collision occurs, one station will "win" access to the data period while the other stations will wait until another available data period. Any suitable collision detection and avoidance network algorithm may be used to control access to the contention based periods such as, for example, a carrier sense multiple access with collision detection ("CSMA/CD") protocol. Service periods are data periods that are allocated to one particular station to transmit data to another particular station. For example, a service period may be allocated to transmit data from central station 110 to remote station 120a, from remote station 120b to central station 110, from remote station 120c to remote station 120d, or any other combination.

The allocation of data periods 231 may be performed by central station 110. This allocation may be made based at least in response to requests received at central station 110 from remote stations 120 and/or in response to central station 110 polling remote stations 120 to determine their data transmission requirements. This allocation may also be made based on the resource requirements from central station 110 itself. Some data periods 231 may be pseudo-static, meaning the same data period may be allocated by default at the same time and for the same duration in each beacon interval. Other data periods 231 may be allocated as needed on a dynamic basis for each beacon interval. Additionally, portions of data transmission time 230 may be unallocated to any data period. As will be discussed in more detail below, the unallocated portions of the data transmission time 230 may be used to extend the duration of one or more data periods 231.

Beacon transmission time 210 may be used by a central station to notify remote stations of the data period schedule information for data transmission time 230 of a current beacon interval 200 (e.g., via beacon signals 125 (FIG. 1)). Alternatively, central station 110 may also unicast this data period schedule information (e.g., via an announce frame) to each remote station 120, one by one, during control data time 220. Control data time 220 of beacon interval 200 may also be used by remote stations to communicate control information to a central station including, for example, requests from remote stations to a central station to allocate a data period 231.

After the data period schedule information for a beacon interval 200 is received by the remote stations in a radio cell, the remote stations will know when they are allowed to transmit data, when they are expected to receive data, and when they can remain idle and/or go into a power save mode. The remote stations will also know, from the data period schedule information, which directions to point their antennas for each allocated service period 231.

If the data period schedule information for a beacon interval is not received by a remote station, that remote station may have no knowledge of the data period allocations for that beacon interval. If there are pseudo-static data periods, the remote station may assume that those pseudo-static data periods might apply to the current beacon interval. For the remaining duration of the beacon interval, the remote station may stay awake (and not go into a power save mode) and may point its antennas to the central station. This allows the remote station to receive any data or control information transmitted from the central station to the remote station (including any retransmissions of the data period schedule information). For example, if remote station 120a (FIG. 1) does not receive beacon signal 125a or a control signal (not shown) with the data period schedule information for beacon interval 200 (FIG. 2) from central station 110, remote station 120a will remain awake and point its antennas to central station 110 for the duration of the beacon interval. If data period 231b is a pseudo-static data period that is assigned to remote station 120c to transmit data to remote station 120a, remote station 120a may point its antennas to remote station 120c during pseudo-static data period 231b. If data period 231e is a pseudo-static data period that is assigned to remote station 120c to transmit data to remote station 120d, remote station 120a may go into a power save mode during pseudo-static data period 231e.

Figure 3:
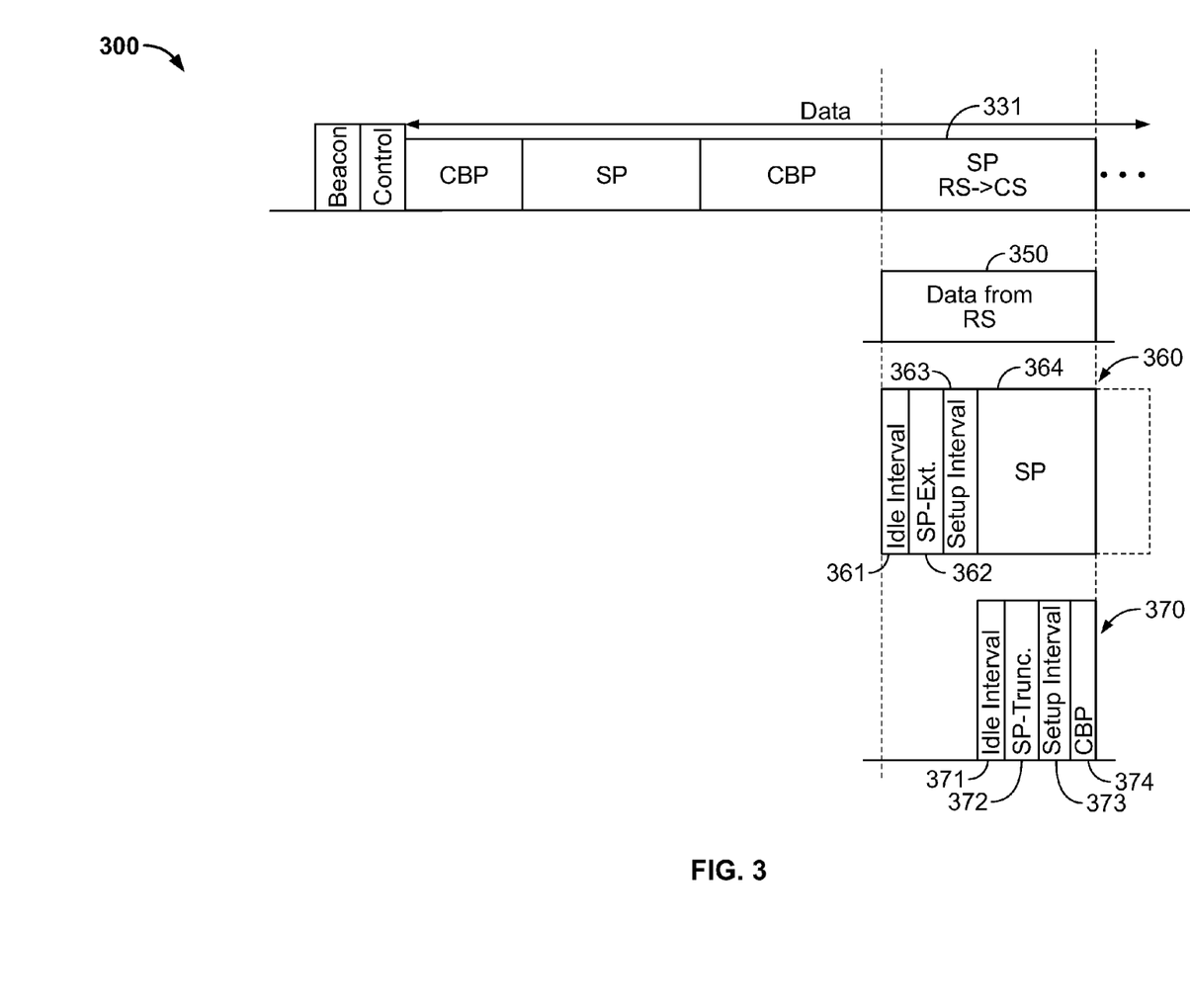
FIG. 3 shows an illustrative service period recovery scheme for a service period allocated for the transmission of data between a remote station and a central station in accordance with some embodiments.

FIG. 3 shows an illustrative service period recovery scheme for a service period allocated for the transmission of data from a remote station to a central station in accordance with some embodiments. Data sequence 300 is part of a beacon interval that includes service period 331 allocated for a remote station (RS) (e.g., remote station 120a (FIG. 1)) to transmit data to a central station (CS) (e.g., central station 110 (FIG. 1)). If the remote station receives the data period schedule information for the beacon interval, the remote station will transmit data 350 to the central station during allocated service period 331. If the remote station does not receive the data period schedule information, the remote station will not know to transmit its data to the central station during service period 331. As illustrated in data sequence 360, after waiting for data from the remote station in service period 331 for a predetermined idle interval 361, the central station may transmit a service period change/extension announcement (SP-Ext.) 362 to the remote station. Service period change/extension announcement signal 362 schedules a modified service period 364 to replace missed service period 331. Modified service period 364 can begin after a predetermined setup interval 363. Service period change/extension announcement 362 may include a new service period start time and the length of the modified service period. If there is unallocated data transmission time after the scheduled end of missed service period 331, modified service period 364 may be extended to include the remaining portion of missed service period 331 and any unallocated time. Modified service period 364 may be extended to have a duration equal to or greater than the duration of missed service period 331. If there is not enough unallocated time after missed service period 331 to extend modified service period 364, modified service period 364 may be shorter than missed service period 331.

If the remote station receives service period change/extension announcement 362, remote station may transmit data to the central station during modified service period 364. However, as illustrated in data sequence 370, if the remote station does not receive service period change/extension announcement 362, the remote station will not transmit data to the central station during modified service period 364. After a predetermined idle interval 371 into the beginning of modified service period 364, the central station may truncate the original, missed service period 331 and may allocate the remaining portion of service period 331 to other remote stations. Modified service period 364 is cancelled. For example, as illustrated in sequence 370, the central station may broadcast a service period truncation signal (SP-Trunc.) 372 allocating the remaining portion of missed service period 331 as a contention based period 374. If there is unallocated time after missed service period 331, the remaining portion of missed service period 331 may be extended. If the remaining portion of missed service period 331 is short (and is not followed by unallocated time) the remaining portion of missed service period 331 may remain allocated to the original station pair, may be allocated to another station pair, may be allocated as a contention based period, or may be allowed to lapse without reallocating. Thus, it can be seen that by monitoring the allocated service periods, the central station may allow service periods to be recovered for use by the assigned station pairs or by other station pairs. Otherwise, the missed service periods may be wasted. Furthermore, by allowing a modified service period to be extended, there may be no need to reschedule missed service periods into later beacon intervals.

Figure 4:
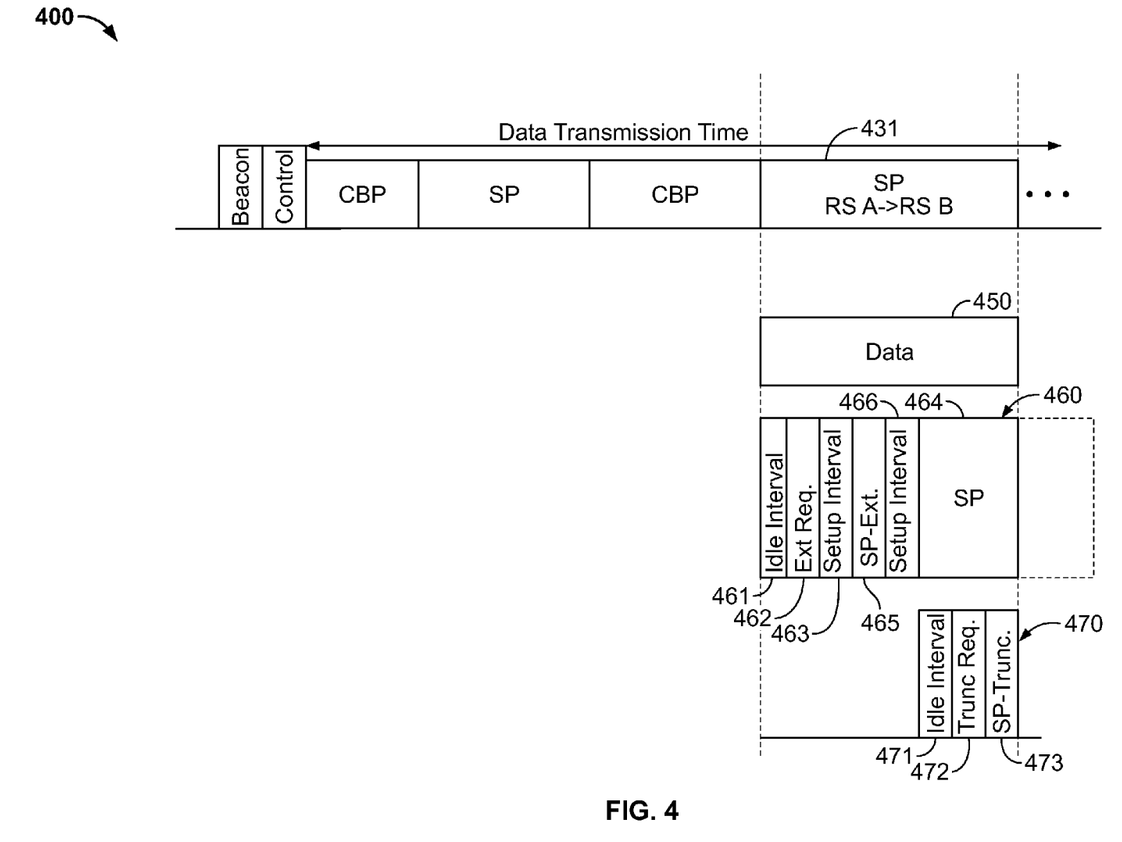
FIG. 4 shows an illustrative service period recovery scheme for a service period allocated for the transmission of data between two remote stations in accordance with some embodiments.

FIG. 4 shows an illustrative service period recovery scheme for service period 431, allocated for the transmission of data between two remote stations (RS A and RS B) in accordance with some embodiments. The two remote stations may be, for example, remote stations 120a and 120b of FIG. 1. Data sequence 400 is part of a beacon interval that includes service period 431 allocated for remote station A (RS A) to transmit data to remote station B (RS B). Remote station B may point its antennas toward remote station A for the duration of allocated service period 431. If remote station A receives the data period schedule information for the beacon interval of data sequence 400, remote station A will transmit data 450 to remote station B during allocated service period 431. If however, remote station A does not receive the data period schedule information for the beacon interval of data sequence 400, it will not transmit data to remote station B. As illustrated in sequence 460, after waiting for data from remote station A in allocated service period 431 for a predetermined idle interval, remote station B can alert the central station by sending a service period change/extension request (Ext Req.) 462 to the central station (e.g., central station 110 (FIG. 1)). In response to service period change/extension request 462 and after setup interval 463, the central station may transmit a service period change/extension announcement 465 (SP-Ext.) to remote station A. Service period change/extension announcement 465 schedules a modified service period 464 to replace missed service period 431. Modified service period 464 can begin after a setup interval 466. As with the illustrative service period recovery scheme of FIG. 3, service period change/extension announcement 465 may include a new service period start time and a length of the modified service period. If remote station A receives service period change/extension announcement 465, remote station A may transmit data to remote station B during modified service period 464.

As illustrated in sequence 470, if remote station A does not receive service period change/extension announcement 465, remote station A will not transmit data to remote station B during modified service period 464. After a predetermined idle interval 471 after the beginning of modified service period 464, remote station B may send a truncation request (Trunc Req.) 472 to the central station. Truncation request 472 instructs the central station to truncate the original, missed service period 431. The central station may then allocate the remaining portion of missed service period 431 to other stations. For example, as illustrated in sequence 470 the central station may broadcast a service period truncation signal (SP-Trunc.) 473 in response to truncation request signal 472. Service period truncation signal 473 allows the central station to reallocate the remaining portion of missed service period 431 to the original station pair, to another station pair, or as a contention based period using a service period grant announcement (not shown). Alternatively, as illustrated in FIG. 4, if the remaining portion of missed service period 431 is short (and is not followed by a period of unallocated time) the remaining portion of missed service period 431 may be left without reallocating. Thus it can be seen that the central station may attempt service period recovery for service periods allocated for communication between two remote stations. Although the central station does not directly detect whether a remote station is transmitting during an allocated service period, the receiving remote station is able to report a missed transmission to the central station.

Figure 5A:
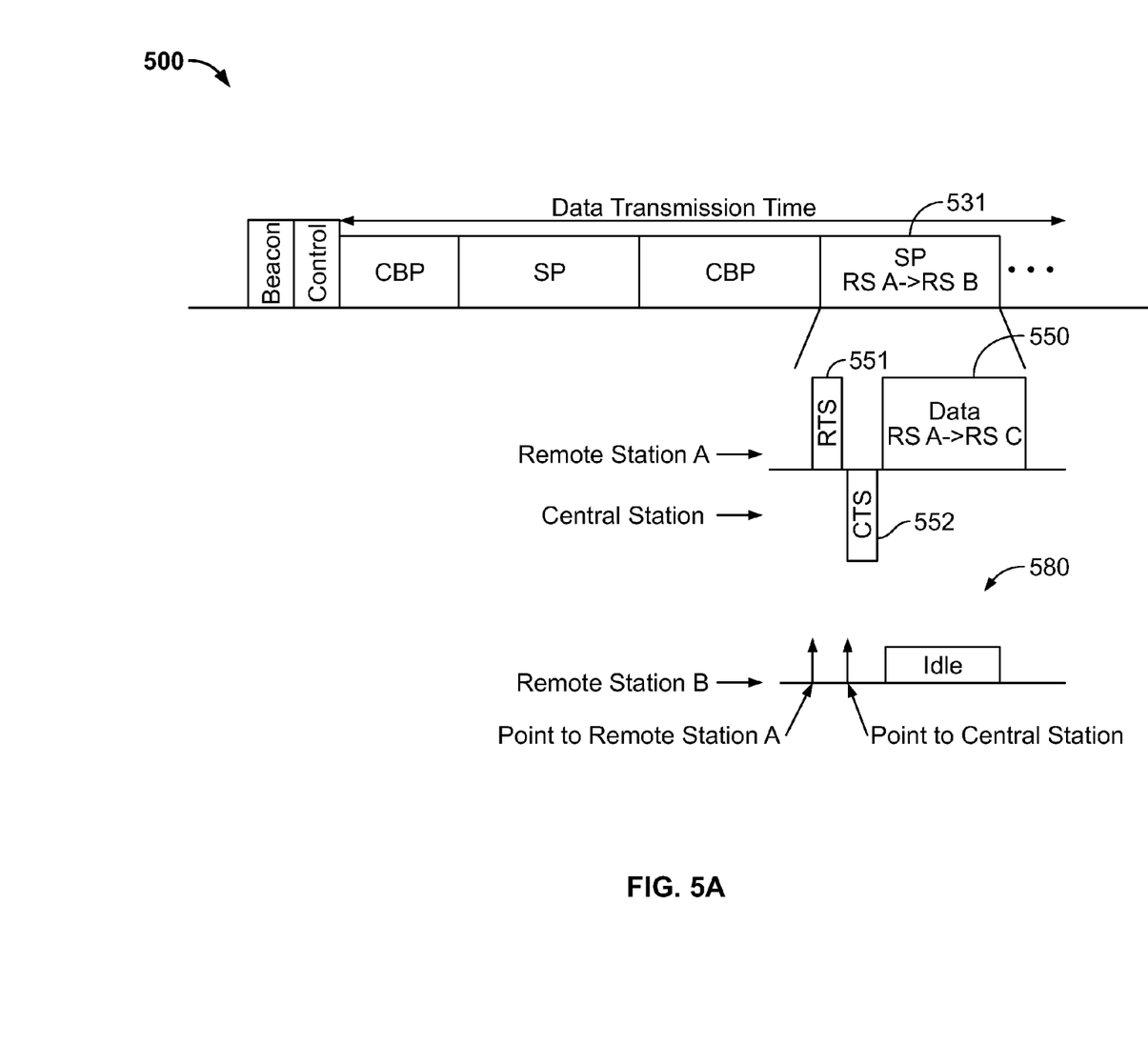
FIGS. 5A and 5B show another illustrative service period recovery scheme for a service period allocated to for the transmission of data between two remote stations in accordance with some embodiments.
Figure 5B:
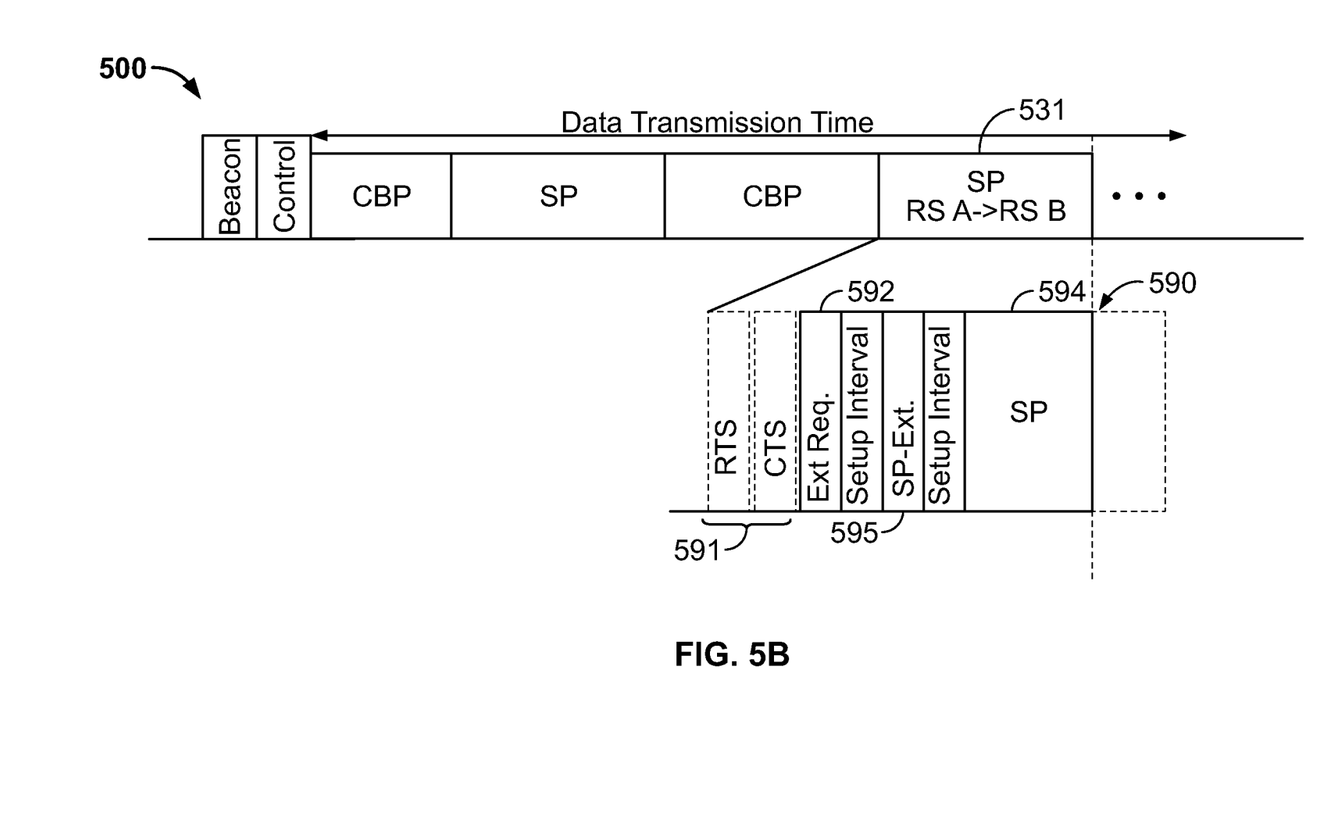

FIGS. 5A and 5B (which may sometimes be referred to collectively as FIG. 5) show an illustrative service period recovery scheme for a service period allocated for the transmission of data between two remote stations where there may have been a change in the destination remote station during the service period. Data sequence 500 is part of a beacon interval that includes service period 531 allocated for remote station A (STA A) to transmit data to remote station B (STA B). For example, remote station A and remote station B may be remote stations 120a and 120b of FIG. 1, respectively. During allocated service period 531, remote station B points its antennas to remote station A and waits for a transmission from remote station A. As illustrated in data sequence 550, if remote station A decides to use allocated service period 531 to transmit data to remote station C (e.g., remote station 120c (FIG. 1)) instead of remote station B, remote station A can transmit a channel reservation request frame 551 (RTS) with remote station C as the destination to the central station (e.g., central station 110 (FIG. 1)). The central station responds to channel reservation request frame 551 by broadcasting a channel reservation frame 552 (CTS). As illustrated in data sequence 580, remote station B may point its antennas to remote station A at the beginning of allocated service period 531. If remote station B does not receive any data from remote station A a predetermined idle interval after the beginning of allocated service period 531, remote station B will point its antennas to the central station to receive channel reservation frame 552. If remote station B receives channel reservation frame 552 from the central station, remote station B may remain idle or go into a sleep mode for the duration of service period 531.

If remote station B does not receive channel reservation frame 552, remote station B may assume that remote station A missed the data period schedule information allocating service period 531. In this case remote station B can trigger a service period recovery by sending a service period change/extension request (Ext Req.) to the central station. The service period recovery sequence illustrated in FIG. 5B shows data sequence 500, including service period 531, of FIG. 5A. FIG. 5B also shows data sequence 590 which follows data sequence 580 if remote station B does not receive channel reservation frame 552. After waiting for an idle period 591, remote station B sends service period change/extension request 592 to the central station. Idle period 591 is at least the length of time required for the central station to receive a potential channel reservation request frame (RTS) from remote station A and to transmit a channel reservation frame (CTS). In response to service period change/extension request 592 and after a setup interval, the central station may transmit a service period change/extension announcement 495 (SP-Ext.) to remote station A. Service period change/ extension announcement 495 schedules a modified service period 494 to replace missed service period 531. Modified service period 494 begins after a setup interval. As with the illustrative service period recovery schemes of FIG. 3 and FIG. 4, service period change/extension announcement 495 may include a new service period start time and a length of the modified service period. If remote station A receives service period change/extension announcement 495, remote station A may transmit data to remote station B during modified service period 494. If remote station B does not receive data from remote station A during modified service period 494, remote station B may send a truncation request to the central station. The truncation of missed service period 531 may follow the same sequence described above with respect to the illustrative service period recovery scheme of FIG. 4.

It should be understood that the various time periods described above (e.g., idle time periods, setup intervals, etc.) may be fixed time periods or may vary based on the mobile network. Furthermore these time periods may be the same for every station or may vary based on station capabilities, configurations, or distances.

Figure 6:
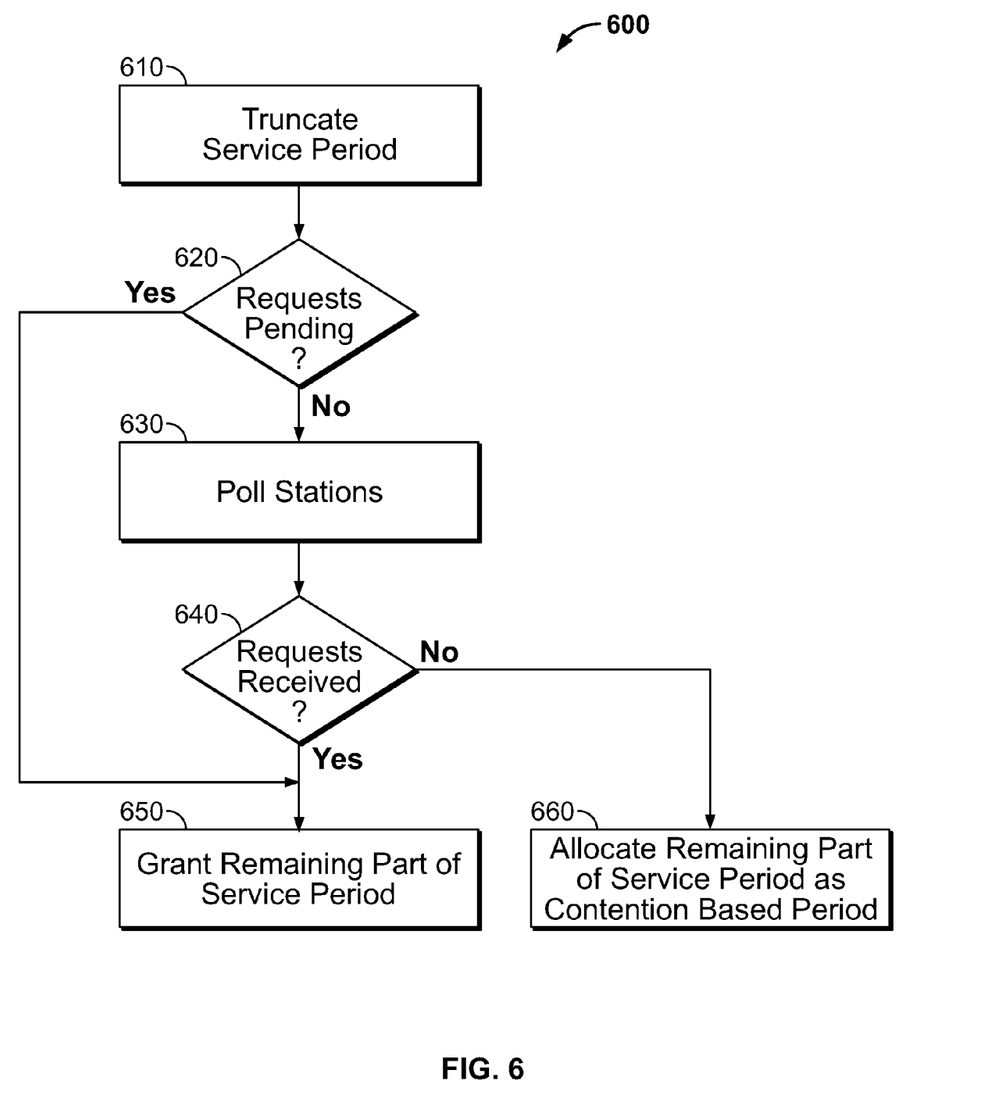
FIG. 6 shows an illustrative embodiment for reallocating a service period after it is truncated in accordance with some embodiments.

In some embodiments, after a central station (e.g., central station 110 (FIG. 1)) detects or is notified by a remote station (e.g., remote stations 120 (FIG. 2)) that an allocated service period is idle, the central station may truncate the idle service period instead of triggering the service period recovery schemes as described above with respect to FIGS. 3-5. FIG. 6 shows an illustrative embodiment 600 for reallocating a service period after it is truncated.

At 610, a central station (e.g., central station 110 (FIG. 1)) truncates an allocated service period. This allocated service period may be truncated in response to a truncation request from a remote station (e.g., remote station 120a (FIG. 1)) or may be truncated by the central station in response detecting or being notified that the allocated service period is idle. At 620, it is determined whether there are outstanding requests for data transmission time from any remote stations or from the central station. At 630, if the are not enough outstanding requests for data transmission time, the central station will poll the remote stations to determine their data transmission requirements. The central station may poll the remote stations by transmitting individual polling requests to each of the remote stations or may broadcast a polling request to all of the remote stations at the same time. At 640, the central station waits for requests for data transmission time to be received. At 650, if requests for data transmission time are pending and/or are received, the remaining part of the truncated service period may be granted to one or more stations based on the requests. Note that the remaining part of the truncated service period can be reallocated to the original remote station or original remote station pair. If the central station decides to do so, it may choose to skip the truncation and/or polling procedures 610-640, and directly grant the remaining service period to the original remote station at 650. Also the central station may send a service period grant announcement to the original remote station to remind the original remote station about upcoming service periods (in case the first remote station missed previously transmitted service period schedule information). As described above with respect the service period recovery schemes of FIGS. 3-5, if additional time is available the remaining part of the truncated service period may be extended. A service period grant announcement, including the granted service period information, is sent to the remote stations that have been granted data transmission time within the truncated service period. At 660, if no requests for data transmission time are pending or received the remaining part of the truncated service period is allocated as a contention based period. The central station may also skip the polling procedures 620-640 and directly allocate the remaining service period as contention based period 660 right after the truncation 610.

A number of service period recovery schemes have been described to minimize unnecessary loss of service periods, thereby improving performance of a network. It will be understood that the foregoing is only illustrative of the principles of the disclosure, and that the disclosed technology can be practiced by other than the described embodiments, which are presented for purposes of illustration and not of limitation, and the present disclosure is limited only by the claims which follow.

What is claimed is:

1. A method for service period recovery in a wireless communications system, the method comprising:
   assigning an initial service period to a first remote station for transmitting data;
   transmitting data period schedule information from a central station including the assignment of the initial service period;
   in response to determining that the first remote station is not transmitting during the initial service period, assigning a modified service period to the first remote station;
   transmitting a service period change announcement from the central station including the modified service period, wherein the modified service period is a defined period of time that differs from the initial service period;
   in response to determining that the first remote station is not transmitting during the modified service period, truncating the modified service period; and
   transmitting a service period truncation message from the central station to the first remote station, wherein the service period truncation message notifies the first remote station that it is no longer assigned the modified service period.

2. The method of claim 1 wherein the initial service period is assigned to the first remote station for transmitting data to the central station.

3. The method of claim 2 wherein determining that the first remote station is not transmitting during the initial service period and wherein determining that the first remote station is not transmitting during the modified service period both comprise waiting a predetermined period of time before making the determination.

4. The method of claim 1 wherein assigning the modified service period to the first remote station comprises extending a length of a remaining portion of the initial service period.

5. The method of claim 1 wherein truncating the modified service period comprises allowing a second remote station to use a portion of the modified service period to transmit data.

6. The method of claim 1 wherein the initial service period is assigned to the first remote station for transmitting data to a second remote station.

7. The method of claim 6 wherein determining that the first remote station is not transmitting during the initial service period comprises receiving a truncation request message from the second remote station.

8. The method of claim 7 wherein the second remote station generates the truncation request message after waiting a predetermined period of time for transmission from the first remote station.

9. The method of claim 1 wherein the wireless communications system comprises a microwave communication system using 60 GHz directional transmissions.

10. A wireless communications system comprising:
    a central station operative to:
    assign an initial service period to a first remote station for transmitting data,
    transmit schedule information including the assignment of the initial service period,
    assign a modified service period to the first remote station in response to a determination that the first remote station is not transmitting during the initial service period,
    transmit a service period change announcement including the modified service period, wherein the modified service period is a defined period of time that differs from the initial service period,
    truncate the modified service period in response to a determination that the first remote station is not transmitting during the modified service period, and
    transmit a service period truncation message to the first remote station, wherein the service period truncation message notifies the first remote station that it is no longer assigned the modified service period.

11. The system of claim 10 wherein the initial service period is assigned to the first remote station for transmitting data to the central station.

12. The system of claim 11 wherein the central station is operative to wait a predetermined period of time both before making the determination that the first remote station is not transmitting during the assigned initial service periods and before making the determination that the first remote station is not transmitting during the modified service period.

13. The system of claim 10 wherein the central station is further operative to extend a length of a remaining portion of the initial service period.

14. The system of claim 10 wherein the central station is further operative to allow a second remote station to use a portion of the modified service period to transmit data in response to truncating the modified service period.

15. The system of claim 10 wherein the initial service period is assigned to the first remote station for transmitting data to a second remote station.

16. The system of claim 15 wherein the central station is operative to determine that the first remote station is not transmitting during the assigned initial service period in response to receiving a truncation request message from the second remote station.

17. The system of claim 16 wherein the truncation request message is generated by the second remote station after waiting a predetermined period of time for the transmission from the first remote station.

* * * * *